C. H. & C. F. STUCKE.
HEADLIGHT FOR MOTOR VEHICLES.
APPLICATION FILED JAN. 27, 1916.
1,183,693.
Patented May 16, 1916.
2 SHEETS—SHEET 1.
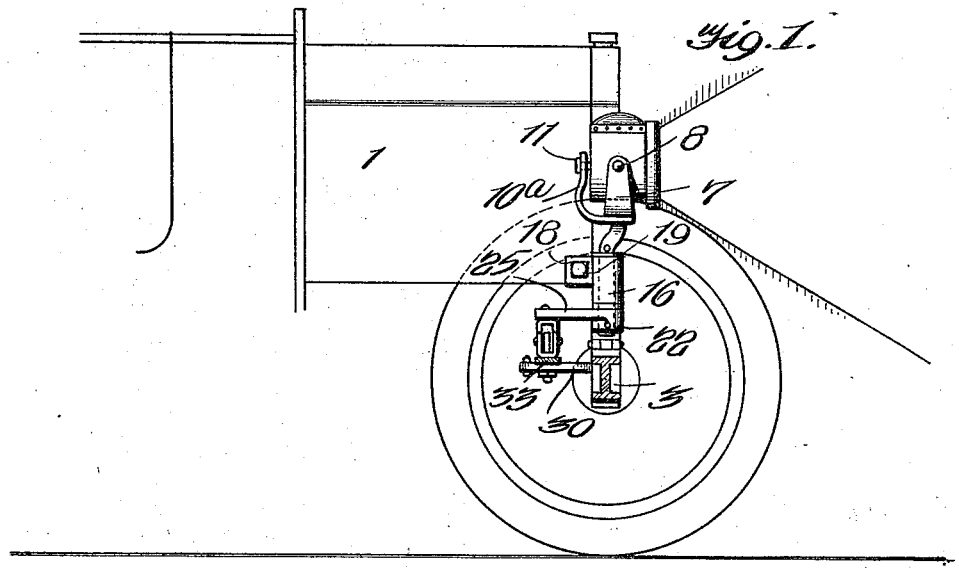
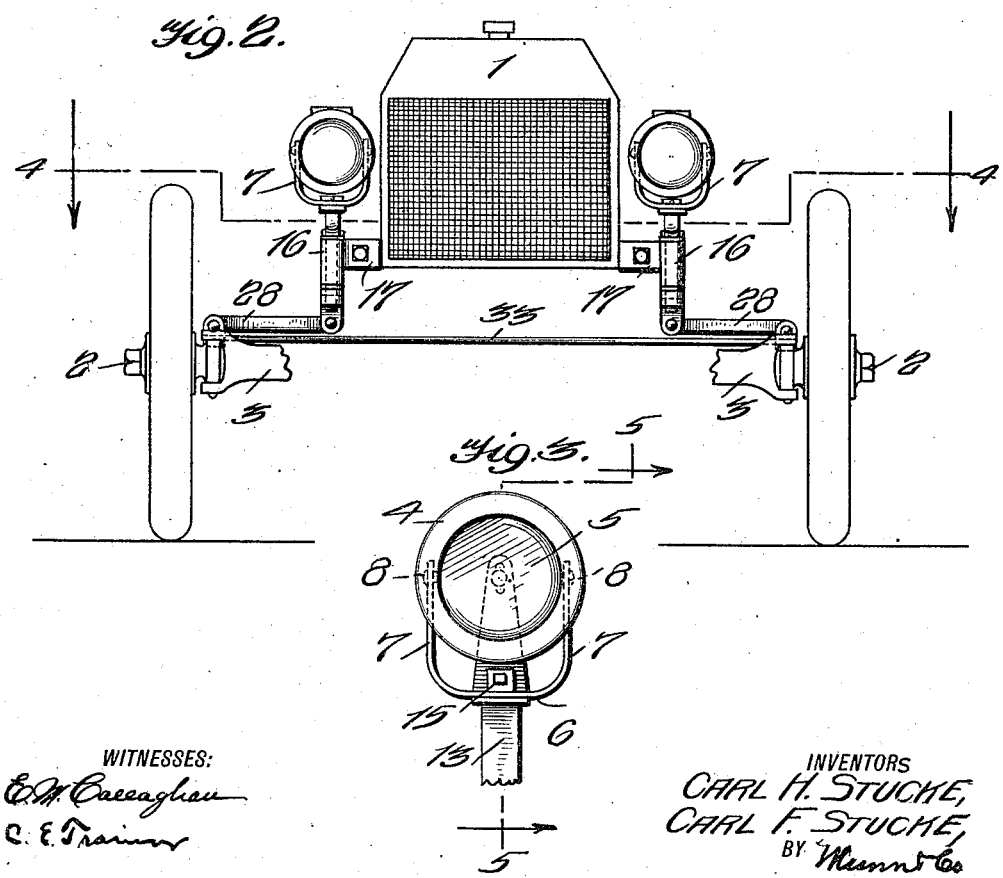

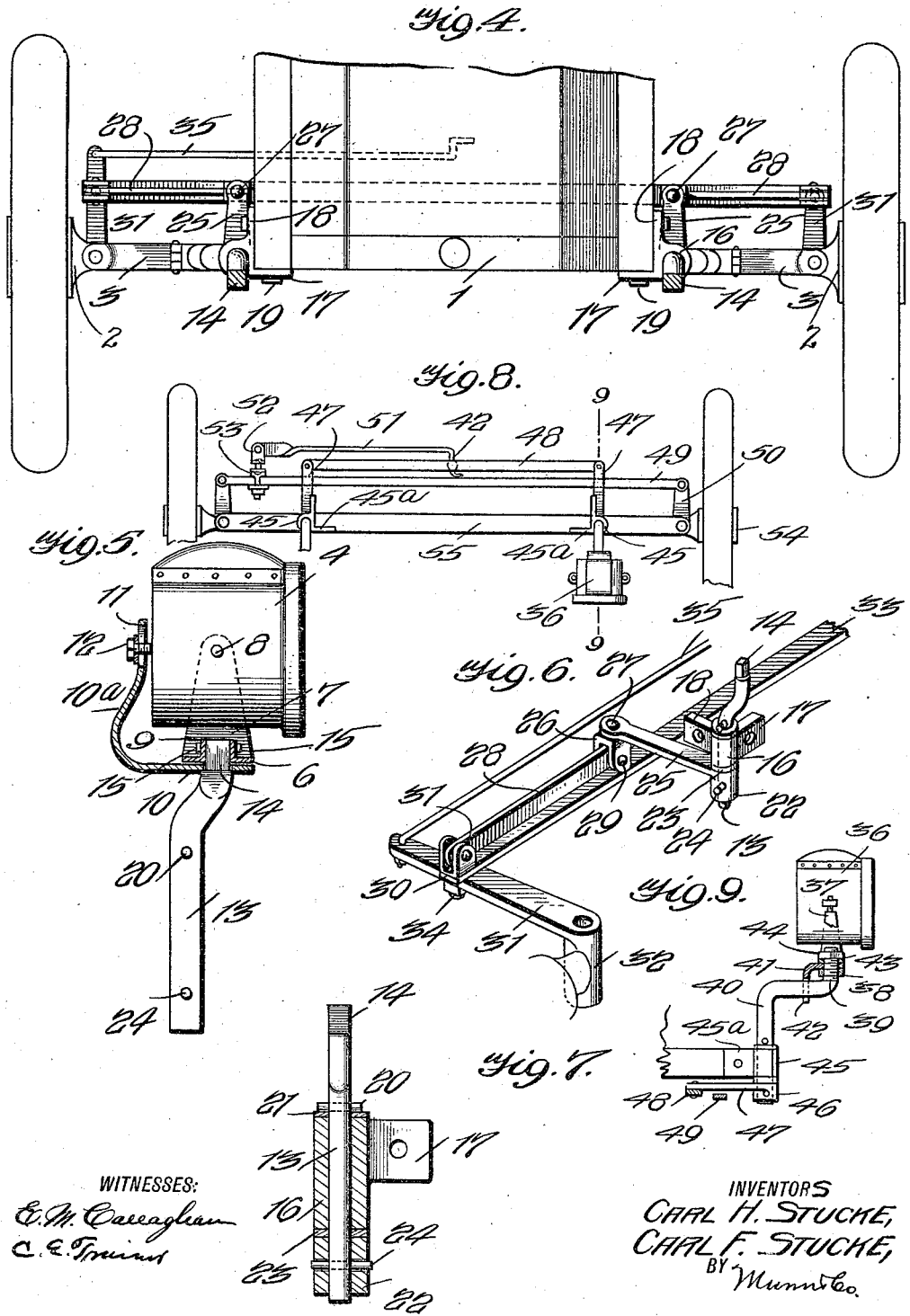

UNITED STATES PATENT OFFICE.

CARL H. STUCKE, OF SPRINGFIELD, MINNESOTA, AND CARL F. STUCKE, OF MILBANK, SOUTH DAKOTA.

HEADLIGHT FOR MOTOR-VEHICLES.

1,183,693.            Specification of Letters Patent.       Patented May 16, 1916.

Application filed January 27, 1916. Serial No. 74,647.

*To all whom it may concern:*

Be it known that we, CARL H. STUCKE, a citizen of the United States, and a resident of Springfield, in the county of Brown and State of Minnesota, and CARL F. STUCKE, a citizen of the United States, and a resident of Milbank, in the county of Grant and State of South Dakota, have invented certain new and useful Improvements in Headlights for Motor-Vehicles, of which the following is a specification.

Our invention is an improvement in headlights for motor vehicles, and the invention has for its object to provide a headlight and a mounting therefor, for connecting the headlight to the vehicle, in such manner that the beam of light thrown by the headlight will follow the direction of turning of the vehicle, instead of extending straight ahead parallel with the long axis of the vehicle.

In the drawings: Figure 1 is a side view of a portion of a motor vehicle provided with the headlight, with parts in section; Fig. 2 is a front view; Fig. 3 is a front view of the headlight and a portion of its mounting; Fig. 4 is a section on the line 4—4 of Fig. 2, looking in the direction of the arrows adjacent to the line; Fig. 5 is a section on the line 5—5 of Fig. 3, looking in the direction of the arrows adjacent to the line; Fig. 6 is a perspective view of the turning mechanism for the headlight; Fig. 7 is an enlarged section of the mounting for the shaft. Fig. 8 is a partial top plan view showing a modified construction of mounting for the lamp, and Fig. 9 is a section on the line 9—9 of Fig. 8.

The present embodiment of the invention is shown in connection with a motor vehicle, the headlights being arranged on opposite sides of the hood 1 of the automobile, and supported by the hood at opposite sides thereof, and connected to the spindles 2 of the front axle 3 in such manner that when the spindles are swung with respect to the axle the beam of light thrown by the headlights will swing in the same direction as the spindles.

Each of the headlights 4 is of ordinary construction, having the lens 5 at its front for condensing and projecting the beam of light, and each headlight is supported by a yoke comprising a body 6 and upwardly extending arms 7. The arms 7 of the headlight extend on opposite sides of the same, and are pivotally connected to the headlight, as indicated at 8, in such manner that each headlight may swing on a transverse horizontal axis to raise or lower the beam of light projected by the headlight.

The body 6 of the yoke has a bearing 9 whose axis is vertical, and an angle plate consisting of portions 10 and 10$^a$ is also connected with the headlight, to assist in properly supporting the same. The portion 10 of the angle plate is horizontal normally, and the said portion has an opening designed to register with the bearing 9 of the yoke. The portion 10$^a$ of the angle plate has a slot 11, and a set screw 12 is passed through this slot into engagement with the rear of the headlight. The portion 10$^a$ of the angle plate extends upwardly in rear of the headlight, and at the angle of the portions 10 and 10$^a$, the angle plate is curved outwardly, as shown more particularly in Fig. 5.

A shaft 13 is provided, the said shaft having a laterally offset journal pin 14 at its upper end, and the journal pin passes through the opening of the portion 10 of the angle plate, and through the bearing 9, and set screws 15 are threaded through the bearing into engagement with the journal pin, to prevent displacement of the bearing.

Each of the shafts 13 is journaled in a bearing sleeve 16, and each bearing sleeve is provided with a pair of perforated lugs 17 and 18, extending at a right angle with respect to each other, and engaging the front and side of the hood, respectively, as shown in Fig. 4, and bolts or screws 19 are passed through the perforations of the lugs into engagement with the hood, to support the bearing sleeves 16 in proper position on the hood.

A pin 20 is passed through an opening in the shaft above the sleeve, to limit the downward movement of the shaft, and a washer 21 is arranged between the pin and the upper end of the sleeve. The shaft 13 is of a length to extend below the bearing, and below the bearing the shaft is engaged by a second sleeve 22, a washer 23 being arranged between the adjacent ends of the sleeves 16 and 22. A pin 24 is passed through registering openings in the sleeve 22, and in the shaft, for connecting the sleeve to the shaft. The sleeve 22 is provided with a radial arm 25 extending rearwardly alongside the hood, and a substantially U-shaped swivel clip 26 is pivoted to the arm, by means of a bolt or the like, 27, passing through the end of the arm remote from the sleeve, and through the body of the clip as shown.

The arms of the clip 26 extend on opposite sides of one end of a link 28, and the said arms are pivoted to the end of the link by a bolt 29. The other end of the link extends between the arms of a second U-shaped swivel clip 30, and the link is pivoted to the arms of the clip by a bolt. The clips 26 and 30 are oppositely arranged, the arms of the clip 26 depending, while the arms of the clip 30 extend upward.

The steering arms 31 of the vehicle which are rigid with the sleeve 32, arranged in the usual manner between the steering knuckles, and rigid with the spindle 2, extend rearwardly in parallel relation, and they are connected by the steering bar or plate 33 in the usual manner.

The U-shaped clips 30 rest upon the ends of the steering bar, and the ends of the steering bar or plate rest upon the arms 31 of the sleeves 32 of the spindle. A bolt and nut 34 connects each clip 30 and the adjacent end of the steering arm or plate 33 to the arm 31, in such manner that when the steering plate 33 is moved in either direction to swing the spindles, the link 28 will be moved longitudinally to swing the arms 25 in the same direction that the arms 31 are swung. The usual steering link 35 is connected with one of the arms 31, the said arm being extended rearwardly, as shown in Figs. 4 and 6, for connection with the link.

In operation, when the vehicle is turned, that is, when the steering arms 31 are moved by the link 35, in either direction, the links 28 will be moved, and the arms 25 of the sleeves 22 will be swung in the same direction as the arms 31 of the sleeves 32.

The journal pin 14 is polygonal in cross section, as are also the bearing 9 and the opening through the angle plate 10—10$^a$, and the yoke 6—7 will be swung with the shaft 13, to swing the headlights in the same direction as the wheels are swung. Thus the beams of light cast by the headlights will follow the turning of the vehicle, being thrown directly onto the road, instead of straight ahead of the vehicle.

While the improved headlights are supported by the hood, they are yet connected to the spindles in such manner that they swing with the wheel, and that portion of the road along which the vehicle moves will be illuminated, regardless of whether the vehicle turns to the right or to the left. The improved mounting may be connected with any motor vehicle, since no changes are required in the vehicle itself.

In Figs. 8 and 9 a modified construction of mounting is shown, wherein the lamp 36 is mounted in the arms 37 of a yoke, comprising the arms and a body 38. The body of the yoke has an opening through which extends a threaded stem 39 which is a crank offset laterally with respect to a crank shaft 40.

An angle plate 41 consisting of two portions extending at approximately a right angle with respect to each other, is provided in connection with the crank shaft, one of the portions of the angle plate having an opening through which the stem 39 extends, and the other portion is slotted longitudinally, to form arms 42 spaced apart from each other, and engaging opposite sides of the integral connection between the crank arm 39 and the body of the crank shaft 40.

The portion which engages the crank or stem 39 fits above the body 38 of the yoke, and a washer 43 is mounted on the stem above the angle plate, and a nut 44 is threaded on the stem above the washer. The crank shaft 40 has its lower end journaled in a bearing 45 on an angle plate 45$^a$, which is secured to the hood, in the same manner as the angle plate 17—18 of Fig. 1.

The crank shaft 40 is mounted in the bearing 45 which corresponds with the bearing 16 of Fig. 1, in the same manner as the shaft 13 is mounted in the bearing 16, and the lower end of the shaft 40 has pinned thereto a bearing or collar 46, having a radial arm 47 corresponding to the arm 25 of Fig. 1. These radial arms 47 are connected by a connecting plate 48, which extends between the arms and is pivoted to the arms as shown in Fig. 8.

The steering bar 49, which is connected to the steering arms 50 in the usual manner, is connected to the connecting plate 48 by means of a link 51. This link has one end provided with a laterally extending lug 52, which is connected to the connecting bar 48 at its center. The other end of the link 51 is received between the arms of a yoke 52 and is pivoted to the arms, and the yoke is connected to the steering bar 49, adjustably, by means of a clip 53, the said clip being adjustable with respect to the arm 49.

The operation of the last named embodiment of the invention is as follows: When the steering bar or plate 49 is moved longitudinally to swing the spindles 54 which are pivoted to the ends of the front axle 55, the connecting plate 48 will be moved with the plate 49, to cause the lamps 46 to swing with the wheels. The crank portion 39 of each shaft 40 will be swung, to swing the lamp therewith, and the rays of the lamp will follow the turning of the vehicle.

The lamp and the yoke 37—38 are constrained to swing with the element 39, and to preserve a definite angular relation with respect thereto by the angle plate 41. The clips 30 and 26 are swivel clips.

We claim:

1. In combination with a motor vehicle, of a shaft journaled at each side of the front of the hood, and provided at its upper end with a laterally offset threaded crank or stem, a yoke comprising a body portion having an opening for receiving the stem, or crank, and having arms for connection with a headlight, an angle plate consisting of two portions extending at an approximate right angle, one of the portions having an opening for engaging the stem or crank above the body of the yoke, and the other having a fork, the arms engaging the opposite sides of the connection between the crank shaft and the crank, a nut threaded onto the stem above the angle plate, an arm extending radially from each crank shaft, a plate connecting the arms, and means for adjustably connecting said plate to the steering bar of the vehicle.

2. A mounting for the headlights of motor vehicles comprising a shaft adapted to be mounted at each side of the hood to rotate on a vertical axis, each shaft having at its upper end a laterally offset crank or stem for connection with the headlight, and the said crank or stem being threaded, a yoke comprising a body portion having an opening for receiving the stem and arms for connection with the headlight, an angle plate having a portion provided with an opening for engaging the stem above the body of the yoke, and a portion provided with a fork engaging the connection between the crank shaft and the crank, a nut threaded onto the stem for holding the angle plate and yoke body in place, an arm extending radially from each crank shaft, a rigid connection between the arms and pivoted thereto, and means for adjustably connecting said connection to the steering bar of the vehicle.

CARL H. STUCKE.
CARL F. STUCKE.

Copies of this patent may be obtained for five cents each, by addressing the "Commissioner of Patents, Washington, D. C."